(12) United States Patent
Patil et al.

(10) Patent No.: US 10,241,848 B2
(45) Date of Patent: Mar. 26, 2019

(54) PERSONALIZED DIAGNOSTICS, TROUBLESHOOTING, RECOVERY, AND NOTIFICATION BASED ON APPLICATION STATE

(71) Applicant: MICROSOFT TECHNOLOGY LICENSING, LLC, Redmond, WA (US)

(72) Inventors: Nagaraj Patil, Redmond, WA (US); Kiran Nallabothula, Redmond, WA (US); Doru Nica, Redmon, WA (US); Himanshu Misra, Bellevue, WA (US); Minjun Wu, Sammamish, WA (US); Raghavendra Bhuthpur, Sammamish, WA (US); Sathish Kumar Venkat Rangam, Kirkland, WA (US); Srihari Busam, Redmond, WA (US); Nagaraju Palla, Bellevue, WA (US); Ning Zhuang, Bellevue, WA (US); Ming Yang, Redmond, WA (US); Xiaoyu Li, Bellevue, WA (US); Eddie Fong, Redmond, WA (US); Katy Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 15/283,276

(22) Filed: Sep. 30, 2016

(65) Prior Publication Data

US 2018/0095814 A1 Apr. 5, 2018

(51) Int. Cl.
*G06F 11/00* (2006.01)
*G06F 11/07* (2006.01)

(52) U.S. Cl.
CPC ........ *G06F 11/0709* (2013.01); *G06F 11/079* (2013.01); *G06F 11/0751* (2013.01); *G06F 11/0769* (2013.01); *G06F 11/0793* (2013.01)

(58) Field of Classification Search
CPC ............. G06F 11/0709; G06F 11/0751; G06F 11/0769; G06F 11/079; G06F 11/0793; G06F 11/0766; G06F 11/0784
See application file for complete search history.

(56) References Cited

U.S. PATENT DOCUMENTS

| 5,983,364 | A | 11/1999 | Bortcosh et al. |
| 6,807,643 | B2 | 10/2004 | Eckardt et al. |

(Continued)

FOREIGN PATENT DOCUMENTS

| EP | 1643426 A2 | 4/2006 |
| EP | 1847949 A1 | 10/2007 |

(Continued)

OTHER PUBLICATIONS

"Fix Outlook account problems in Office 365", Retrieved on: Jun. 29, 2016 Available at: https://portal.office.com/support/help.aspx?sid=sara#/330cfd4a-358a-47fc-a679-71c762039f09.

(Continued)

*Primary Examiner* — Joseph D Manoskey
(74) *Attorney, Agent, or Firm* — Michael Best & Friedrich LLP

(57) ABSTRACT

Personalized diagnostics, troubleshooting, recovery, and notification based on application state is provided. In some examples, system, application, and device level configuration and usage data may be collected as telemetry data. Upon detection of a crash or similar problem, or upon user activation, an assistance service and/or a local assistance application component may execute diagnostics on the crashed application based on the telemetry data, user cre- (Continued)

dentials, known problems, and other factors which may be recorded by the assistance application and/or other system elements. Suitable recovery actions may be taken. If recovery actions are unsuccessful, diagnostic information may be provided to a support system and the issue elevated. Moreover, collected information may be provided to a system database for generating data insights and determining error patterns.

20 Claims, 7 Drawing Sheets

(56) References Cited

U.S. PATENT DOCUMENTS

| | | | |
|---|---|---|---|
| 7,162,488 | B2 | 1/2007 | DeVorchik et al. |
| 7,593,991 | B2 | 9/2009 | Friedman et al. |
| 7,599,935 | B2 | 10/2009 | La Rotonda et al. |
| 7,647,559 | B2 | 1/2010 | Yozell-Epstein et al. |
| 7,917,591 | B2 | 3/2011 | Vakkalanka |
| 8,135,617 | B1 | 3/2012 | Agostino et al. |
| 8,140,905 | B2 | 3/2012 | Beaty et al. |
| 8,185,591 | B1 | 5/2012 | Lewis |
| 8,201,096 | B2 | 6/2012 | Robert et al. |
| 8,204,717 | B2 | 6/2012 | McLaughlin et al. |
| 8,239,853 | B2 | 8/2012 | Lee |
| 8,516,038 | B2 | 8/2013 | Jalon et al. |
| 8,578,261 | B1 | 11/2013 | Gupta et al. |
| 8,615,380 | B2 | 12/2013 | Kim et al. |
| 8,631,079 | B2 | 1/2014 | Affronti et al. |
| 8,661,036 | B2 | 2/2014 | Turski et al. |
| 8,701,046 | B2 | 4/2014 | McCann et al. |
| 8,725,818 | B1 | 5/2014 | Covitz et al. |
| 8,819,701 | B2 | 8/2014 | Wheeler et al. |
| 8,954,579 | B2 | 2/2015 | Do et al. |
| 9,021,428 | B2 | 4/2015 | Ajith Kumar et al. |
| 9,298,355 | B1 | 3/2016 | Beausoleil et al. |
| 9,442,903 | B2 | 9/2016 | Katic |
| 9,491,177 | B2 | 11/2016 | Meyers et al. |
| 9,674,583 | B2 | 6/2017 | Fisher et al. |
| 2002/0075312 | A1 | 6/2002 | Amadio et al. |
| 2004/0068545 | A1 | 4/2004 | Daniell et al. |
| 2004/0205514 | A1 | 10/2004 | Sommerer et al. |
| 2004/0225381 | A1 | 11/2004 | Ritz et al. |
| 2005/0015678 | A1* | 1/2005 | Miller .............. G06F 11/0748 714/38.14 |
| 2006/0069990 | A1 | 3/2006 | Yozell-epstein et al. |
| 2006/0070077 | A1 | 3/2006 | Erlandson et al. |
| 2006/0136456 | A1 | 6/2006 | Jacobs et al. |
| 2006/0168543 | A1 | 7/2006 | Zaner-godsey et al. |
| 2006/0242286 | A1* | 10/2006 | Hawkins ............. G06F 11/0709 709/223 |
| 2007/0118872 | A1 | 5/2007 | Song et al. |
| 2007/0297029 | A1 | 12/2007 | Low et al. |
| 2008/0109712 | A1 | 5/2008 | Mcbrearty et al. |
| 2008/0282159 | A1 | 11/2008 | Vanderwende et al. |
| 2009/0013216 | A1 | 1/2009 | Abrashkevich et al. |
| 2009/0055684 | A1* | 2/2009 | Jamjoom ............ G06F 11/0709 714/26 |
| 2009/0106674 | A1 | 4/2009 | Bray et al. |
| 2009/0260060 | A1 | 10/2009 | Smith et al. |
| 2009/0313100 | A1 | 12/2009 | Ingleshwar |
| 2009/0319618 | A1 | 12/2009 | Affronti et al. |
| 2010/0095224 | A1 | 4/2010 | Yozell-epstein et al. |
| 2010/0229022 | A1 | 9/2010 | Anand et al. |
| 2010/0235395 | A1 | 9/2010 | Cepuran et al. |
| 2010/0329642 | A1 | 12/2010 | Kam et al. |
| 2011/0153605 | A1 | 6/2011 | Silverman |
| 2011/0167469 | A1 | 7/2011 | Letca et al. |
| 2011/0302308 | A1 | 12/2011 | Prodan et al. |
| 2012/0124147 | A1 | 5/2012 | Hamlin et al. |
| 2012/0150989 | A1 | 6/2012 | Portnoy et al. |
| 2012/0151379 | A1 | 6/2012 | Schultz et al. |
| 2012/0179703 | A1 | 7/2012 | Ajitomi et al. |
| 2012/0192064 | A1 | 7/2012 | Antebi et al. |
| 2012/0233227 | A1 | 9/2012 | Alexander et al. |
| 2012/0278401 | A1 | 11/2012 | Meisels et al. |
| 2012/0278402 | A1 | 11/2012 | Limont et al. |
| 2012/0278403 | A1 | 11/2012 | Costenaro et al. |
| 2012/0278404 | A1 | 11/2012 | Meisels et al. |
| 2012/0284344 | A1 | 11/2012 | Costenaro et al. |
| 2012/0284345 | A1 | 11/2012 | Costenaro et al. |
| 2012/0284639 | A1 | 11/2012 | Yuniardi et al. |
| 2013/0198600 | A1 | 8/2013 | Lockhart et al. |
| 2013/0275422 | A1 | 10/2013 | Silber et al. |
| 2013/0290442 | A1 | 10/2013 | Dgani |
| 2013/0311902 | A1 | 11/2013 | O'shaugnessy et al. |
| 2014/0040226 | A1 | 2/2014 | Sadhukha et al. |
| 2014/0189534 | A1 | 7/2014 | Liu et al. |
| 2014/0214988 | A1 | 7/2014 | Nicolaou et al. |
| 2014/0281895 | A1 | 9/2014 | Tay et al. |
| 2014/0310222 | A1 | 10/2014 | Davlos et al. |
| 2014/0344658 | A1 | 11/2014 | Srinivasan et al. |
| 2014/0372877 | A1 | 12/2014 | Snyder et al. |
| 2015/0100895 | A1 | 4/2015 | Parmar et al. |
| 2015/0106877 | A1 | 4/2015 | Meyers et al. |
| 2015/0134723 | A1 | 5/2015 | Kansal et al. |
| 2015/0143211 | A1 | 5/2015 | Kaufthal et al. |
| 2015/0149611 | A1 | 5/2015 | Lissack |
| 2015/0154156 | A1 | 6/2015 | Meyers et al. |
| 2015/0161123 | A1 | 6/2015 | Sterling et al. |
| 2015/0186390 | A1 | 7/2015 | Katic et al. |
| 2015/0195182 | A1 | 7/2015 | Mathur et al. |
| 2015/0195330 | A1 | 7/2015 | Lee |
| 2015/0200885 | A1 | 7/2015 | Sharp et al. |
| 2015/0248421 | A1 | 9/2015 | Hsiao et al. |
| 2016/0036670 | A1 | 2/2016 | Sadovsky et al. |
| 2016/0065511 | A1 | 3/2016 | Ganin et al. |
| 2016/0094499 | A1 | 3/2016 | Uraizee et al. |
| 2016/0196013 | A1 | 7/2016 | Gardenfors et al. |
| 2016/0283051 | A1 | 9/2016 | Masterson et al. |
| 2016/0283447 | A1 | 9/2016 | Masterson et al. |
| 2016/0313882 | A1 | 10/2016 | Brown et al. |
| 2017/0090705 | A1 | 3/2017 | Fern et al. |
| 2017/0286199 | A1* | 10/2017 | Soini .................. G06F 11/0709 |
| 2018/0095847 | A1 | 4/2018 | Patil et al. |
| 2018/0097711 | A1 | 4/2018 | Nallabothula et al. |

FOREIGN PATENT DOCUMENTS

| | | |
|---|---|---|
| WO | 2011055013 A1 | 5/2011 |
| WO | 2015148328 A1 | 10/2015 |

OTHER PUBLICATIONS

"IBM Knowledge Center", Retrieved on: Jun. 29, 2016 Available at: https://www.ibm.com/support/knowledgecenter/POWER5/ipha5_p5/ipha5kickoff.htm.

"Vmware: Knowledge Base", Retrieved on: Jun. 29, 2016 Available at: https://kb.vmware.com/selfservice/microsites/search.do?language=en_US&cmd=displayKC&externalId=2129384.

"Create a Custom Arrangement to Sort by Conversation in Microsoft Entourage", Retrieved from https://web.archive.org/web/20070813192347/https://www.rit.edu/its/services/desktop_support/mac/entouragecustomviewbyconv.html, Jul. 24, 2007, 2 Pages.

Mathur, Vaibhav, "Yammer Roadmap and Work-like-a-Network", Retrieved From http://blogs.perficient.com/microsoft/2014/05/yammer-roadmap-and-work-like-a-network/, May 9, 2014, 6 Pages.

"IBM Support Assistant", Retrieved From https://www-01.ibm.com/software/support/isa/, Apr. 13, 2014, 1 Page.

"Inline Preview Images", Retrieved From https://developers.google.com/speed/pagespeed/module/filter-inline-preview-images, Aug. 6, 2013, 3 Pages.

"Monitor Health and Performance of your Cloud Computing Resources", Retrieved From https://www.manageengine.com/products/applications_manager/cloud-monitoring.html, Mar. 31, 2011, 3 Pages.

"Monitoring Uptime for your Site", Retrieved From https://web.archive.org/web/20150906132850/https://docs.acquia.com/network/health, Sep. 6, 2015, 8 Pages.

(56) References Cited

OTHER PUBLICATIONS

"New Book: Microsoft Outlook 2010 Step by Step", Retrieved From https://blogs.msdn.microsoft.com/microsoft_press/2010/07/16/new-book-microsoft-outlook-2010-step-by-step/, Jul. 16, 2010, 7 Pages.

"Support and Recovery Assistant for Office365 Available", Retrieved From http://www.sharepointgeoff.com/support-recovery-assistant-office365/, Oct. 13, 2015, 4 Pages.

"The Evolution of Email", Retrieved From https://web.archive.org/web/20140403111816/http://blogs.office.com/2014/03/31/the-evolution-of-email, Mar. 31, 2014, 21 Pages.

"Final Office Action Issued in U.S. Appl. No. 14/669,988", dated Dec. 7, 2017, 93 Pages.

"Non Final Office Action Issued in U.S. Appl. No. 14/669,988", dated Jul. 14, 2017, 80 Pages.

"Final Office Action Issued in U.S. Appl. No. 14/672,032", dated Jan. 24, 2018, 26 Pages.

"Non Final Office Action Issued in U.S. Appl. No. 14/672,032", dated Jun. 4, 2018, 29 Pages.

"Non Final Office Action Issued in U.S. Appl. No. 14/672,032", dated Sep. 25, 2017, 25 Pages.

Premick, Justin, "Video in Email: One Step Closer to Reality?", Retrieved From http://blog.aweber.com/email-marketing/video-email-closer.htm, Retrieved on Jan. 28, 2015, 8 Pages.

"Non Final Office Action Issued in U.S. Appl. No. 15/283,234", dated Jul. 3, 2018, 12 Pages.

"Non Final Office Action Issued in U.S. Appl. No. 15/283,524", dated Apr. 25, 2018, 17 Pages.

Abdul, "5 Cloud Performance Monitoring Tools", Retrieved From https://web.archive.org/web/20120728074517/http://cloudtweaks.com/2012/07/5-cloud-performance-monitoring-tools/, Jul. 25, 2012, 6 Pages.

Bekker, Scott, "Office 365 Tool Tells Partners About Customer Service Outages", Retrieved From https://rcpmag.com/blogs/scott-bekker/2014/01/office-365-tool-service-outages.aspx, Jan. 29, 2014, 3 Pages.

Boucher, Rob, "How to Monitor Cloud Services", Retrieved From https://web.archive.org/web/20160115211903/ https://azure.microsoft.com/en-us/documentation/articles/cloud-services-how-to-monitor/, Jan. 4, 2016, 9 Pages.

Hall, Stephen, "Google+ Hangouts Drive App Discontinued, Replaced with Inline Chat Sharing", Retrieved From https://9to5google.com/2014/11/19/google-hangouts-drive-app-discontinued-replaced-with-inline-chat-sharing/, Nov. 19, 2014, 3 Pages.

Hogg, Jason, "Monitor, Diagnose, and Troubleshoot Microsoft Azure Storage", Retrieved From http://web.archive.org/web/20151001104257/https://azure.microsoft.com/en-in/documentation/articles/storage-monitoring-diagnosing-troubleshooting/, Retrieved on Jun. 29, 2016, 37 Pages.

"How Can We Improve Airmail?", Retrieved From https://airmailapp.uservoice.com/forums/209001-airmail-mac-1-x/suggestions/3722190-make-attachments-accessible-from-conversation-mess, Retrieved on Jan. 28, 2015, 2 Pages.

"International Preliminary Report on Patentability Issued in PCT Application No. PCT/US2016/023497", dated Jun. 8, 2017, 6 Pages.

"International Search Report and Written Opinion Issued in PCT Application No. PCT/US2016/023497", dated Jun. 10, 2016, 10 Pages.

"Second Written Opinion Issued in PCT Application No. PCT/US2016/023497", dated Feb. 20, 2017, 5 Pages.

"International Search Report and Written Opinion Issued in PCT Application No. PCT/US2016/023498", dated Jun. 10, 2016, 11 Pages.

Platon, Oana, "Introduction to Service Fabric Health Monitoring", Retrieved From https://azure.microsoft.com/en-in/documentation/articles/service-fabric-health-introduction/, Retrieved on Jun. 29, 2016, 15 Pages.

"Non Final Office Action Issued in U.S. Appl. No. 14/669,988", dated Aug. 16, 2018, 62 Pages.

"Final Office Action Issued in U.S. Appl. No. 15/283,234", dated Nov. 15, 2018, 13 Pages.

"Final Office Action Issued in U.S. Appl. No. 15/283,524", dated Dec. 14, 2018, 21 Pages.

* cited by examiner

PERSONALIZED DIAGNOSTICS, TROUBLESHOOTING, RECOVERY, AND NOTIFICATION BASED ON APPLICATION STATE

BACKGROUND

Hosted services are increasingly providing valuable services to people in their home and work lives. Bringing applications such as word processing, spreadsheet, presentation, communication, notetaking, collaboration, and others under an umbrella, such services allow users to access, edit, and collaborate on documents through locally installed or cloud-accessible applications.

Hosted services and associated applications form a complex environment that involves local and cloud-stored data, device resources, user attributes, operating system and application configurations, among other things. Such services and their components are also subject to frequent updates and upgrades. Thus, they present a challenge to users when errors happen. Regular users may not be expected to diagnose and correct a majority of errors or crashes. A manual diagnostic and recovery process that involves expert help may also not be feasible or at least experience degrading when a service has a large number (e.g., hundreds of thousands) users.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to personalized diagnostics, troubleshooting, recovery, and notification based on application state. In some examples, a ticket workflow may be initiated in response to one of receiving a report of an issue through an assistance service user interface and automatic detection of the issue. Information associated with one or more of telemetry data, user credential data, system configuration data, device configuration data, application state data may be retrieved and the issue analyzed in view of the retrieved information and an issue database. In response to identifying a resolution for the issue, a recovery action for the identified resolution may be identified. In response to failing to identify the resolution for the issue, the issue may be escalated to a support department, and information associated with the issue, analysis results, and identified resolution may be provided to a data insights database.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
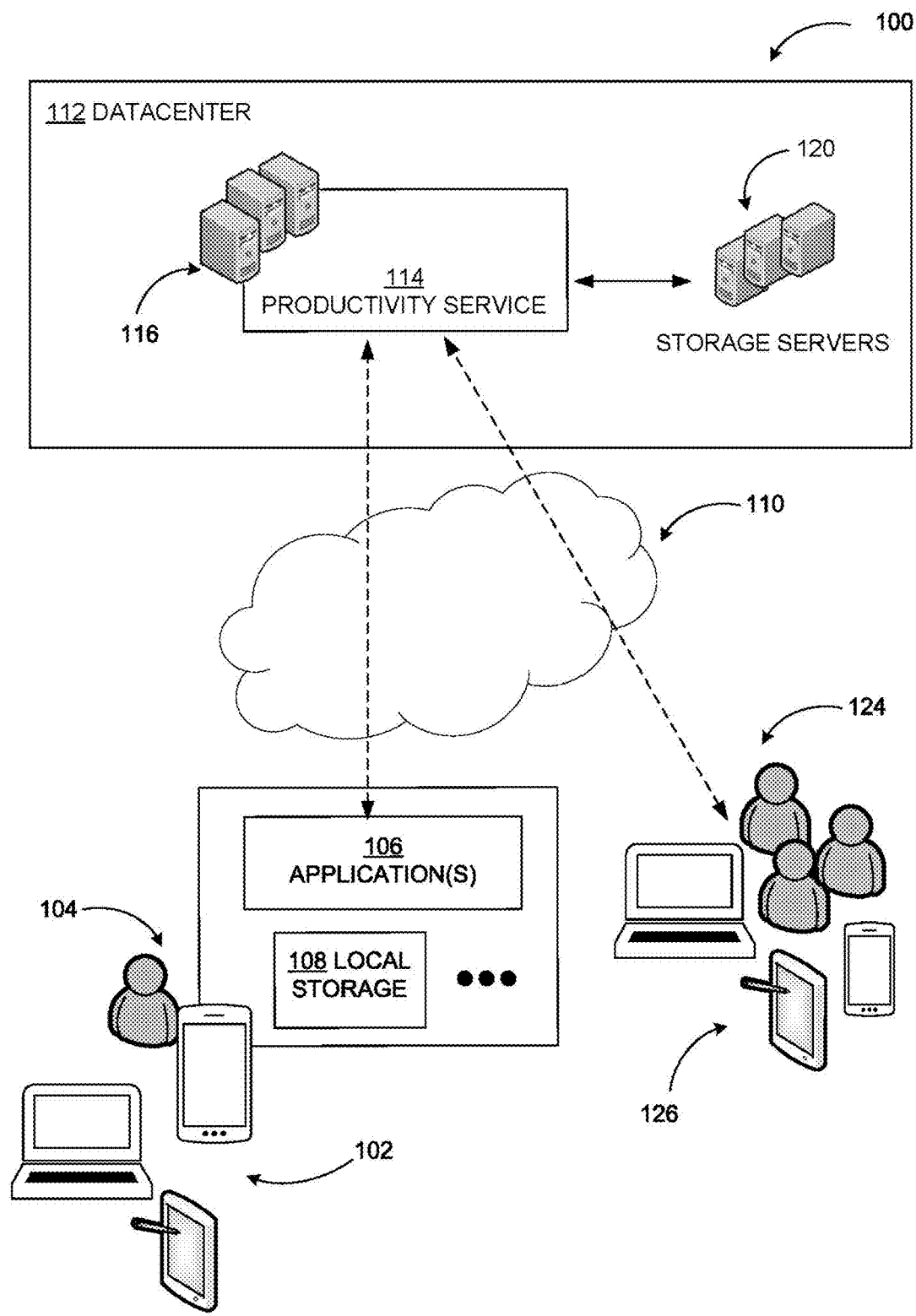
FIG. 1 includes an example system environment where personalized diagnostics, troubleshooting, recovery, and notification based on application state may be implemented.

As briefly described above, embodiments are directed to personalized diagnostics, troubleshooting, recovery, and notification based on application state. In some examples, system, application, and device level configuration and usage data may be collected as telemetry data. Upon detection of a crash or similar problem, or upon user activation, an assistance service and/or a local assistance application component may execute diagnostics on the crashed application based on the telemetry data, user credentials, known problems, and other factors which may be recorded by the assistance application and/or other system elements. Suitable recovery actions may be taken. If recovery actions are unsuccessful, diagnostic information may be provided to a support system and the issue elevated. Moreover, collected information may be provided to a system database for generating data insights and determining error patterns.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing personalized diagnostics, troubleshooting, recovery, and notification based on application state. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes an example system environment where personalized diagnostics, troubleshooting, recovery, and notification based on application state may be implemented.

As illustrated in diagram 100, an example system may include a datacenter 112 hosting a productivity service 114 configured to provide a variety of productivity related applications and may be accessed across multiple devices and users. The datacenter 112 may include one or more processing servers 116 configured to execute the productivity service 114, among other components. In some embodiments, at least one of the processing servers 116 may be operable to manage the productivity service 114, where data from devices (such as devices 122, 126) may be stored with the cloud stored data at storage servers 120 (or associated data stores). As described herein, the productivity service 114 may be implemented as software, hardware, or combinations thereof.

In some embodiments, the productivity service 114 may be configured to interoperate with various applications to provide services such as word processing, spreadsheet processing, presentation, note taking, communications, scheduling, and comparable ones. For example, as illustrated in the diagram 100, a user 104 may execute a thin (e.g., a web browser) or a thick (e.g., a locally installed client application) version of an application 106 through the device 102 with which the productivity service 114 may be configured to integrate and interoperate with over one or more networks, such as network 110. The application 106 may be an application hosted by the productivity service, such as a word processing application, for example. The device 102 may include a desktop computer, a laptop computer, a tablet computer, a vehicle mount computer, a smart phone, or a wearable computing device, among other similar devices. A communication interface may facilitate communication between the productivity service 114 and the application 106 over the network 110.

In an example embodiment, the productivity service 114 may be configured to receive content from the application 106 of the device 102. The received content may be stored remotely at the productivity service 114 within the storage servers 120, for example. As the productivity service 114 includes a number of applications and involves a large number of local and remote resources, errors leading to application crashes or other undesirable results may occur. When a serious error like this occurs, users may have technical support help available. However, given the large number of users subscribing to modern hosted services, scheduling and coordinating technical support may degrade user experience and be expensive to provide for service providers. According to some embodiments, personalized diagnostics, troubleshooting, recovery, and notification based on application state may be provided by an assistance service or application that may be part of the productivity service 114 or a third party service.

Productivity service 114 is used as an illustrative example to describe various aspects of embodiments herein. However, embodiments are not limited to a productivity service. An assistance application or service providing personalized diagnostics, troubleshooting, recovery, and notification based on application state may be implemented with any hosted service such as a collaboration service, an online storage service, and others using the principles described herein.

A system according to embodiments allows personalized diagnostics, troubleshooting, recovery, and notification based on application state. By automatically and dynamically diagnosing system and application issues, performing recovery actions, collecting statistical data, and performing notification tasks, increased efficiency, reduced local and cloud computing resource usage, reduced bandwidth usage, and increased security may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users storing and/or sharing content both locally at client devices and remotely at cloud-based storage services.

Figure 2:
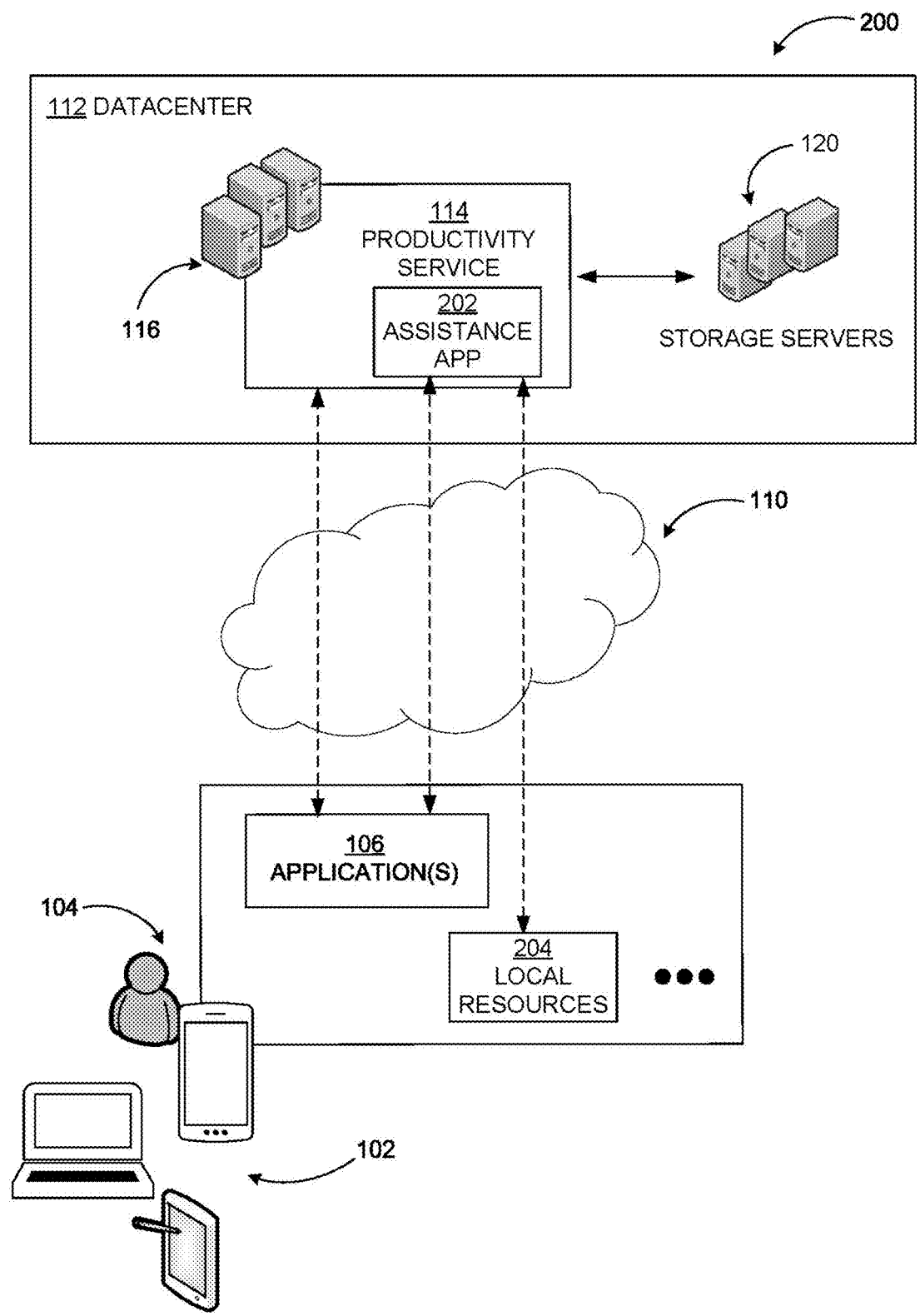
FIG. 2 illustrates conceptually personalized diagnostics, troubleshooting, recovery, and notification based on application state.

FIG. 2 illustrates conceptually personalized diagnostics, troubleshooting, recovery, and notification based on application state.

As shown in diagram 200, diagnostic, recovery, and related actions for the productivity service 114 and its components may be performed by an assistance application 202 that is part of the productivity service 114. The assistance application 202 may be executed on one of the servers 116. In other embodiments, the assistance application 202 or one or more components may be executed on the local devices such as device 102. In further embodiments, the assistance application may be part of an independent assistance service executed on a separate server and provide personalized diagnostics, troubleshooting, recovery, and notification to multiple hosted services.

The assistance application may receive information from a number of sources (e.g., local resources 204). For example, system and device configuration information such as installed and/or running applications, memory availability, processor availability, network bandwidth, display characteristics, and other hardware and software state information may be received from operating systems, local and network task/system managers, other applications and/or services used by the user 104. Because user credentials determine what resources a user has access to and under which circumstances, user credentials may be retrieved from a credential manager or account manager agent. Telemetry data associated with past and current usage may be received from telemetry engines or similar data collectors. Because interactivity with other applications (within or outside the productivity service 114) may have an impact on the performance of individual applications, data from other applications may also be retrieved through standardized or custom application programming interfaces (APIs) on those applications.

In some embodiments, the assistance application 202 may continuously receive data and monitor conditions to identify error patterns. In other embodiments, the assistance application 202 may be activated by the user 104 upon encountering a problem and collect the data at activation to perform diagnostics. The assistance application 202 may analyze collected data and the encountered error, compare to known errors in a database, and determine possible solutions. The assistance application 202 may then apply the potential solutions (recovery actions) automatically. In some cases, the assistance application 202 may prompt the user 104 to take action such as sign off and sign in, or close certain applications, etc.

If a solution is found to address the encountered problem, the assistance application 202 may forward information associated with the encountered error, the identified solution, and state of hardware/software at the time of the error to a data insights database for analysis and updating of errors/solutions database. If a working solution is not identified, the assistance application 202 may escalate the issue to a support department of the productivity service 114 allowing support personnel to have all the background information and contact the user 104 without the user having to go through the process of calling the support department, describing the issue, etc.

Figure 3:
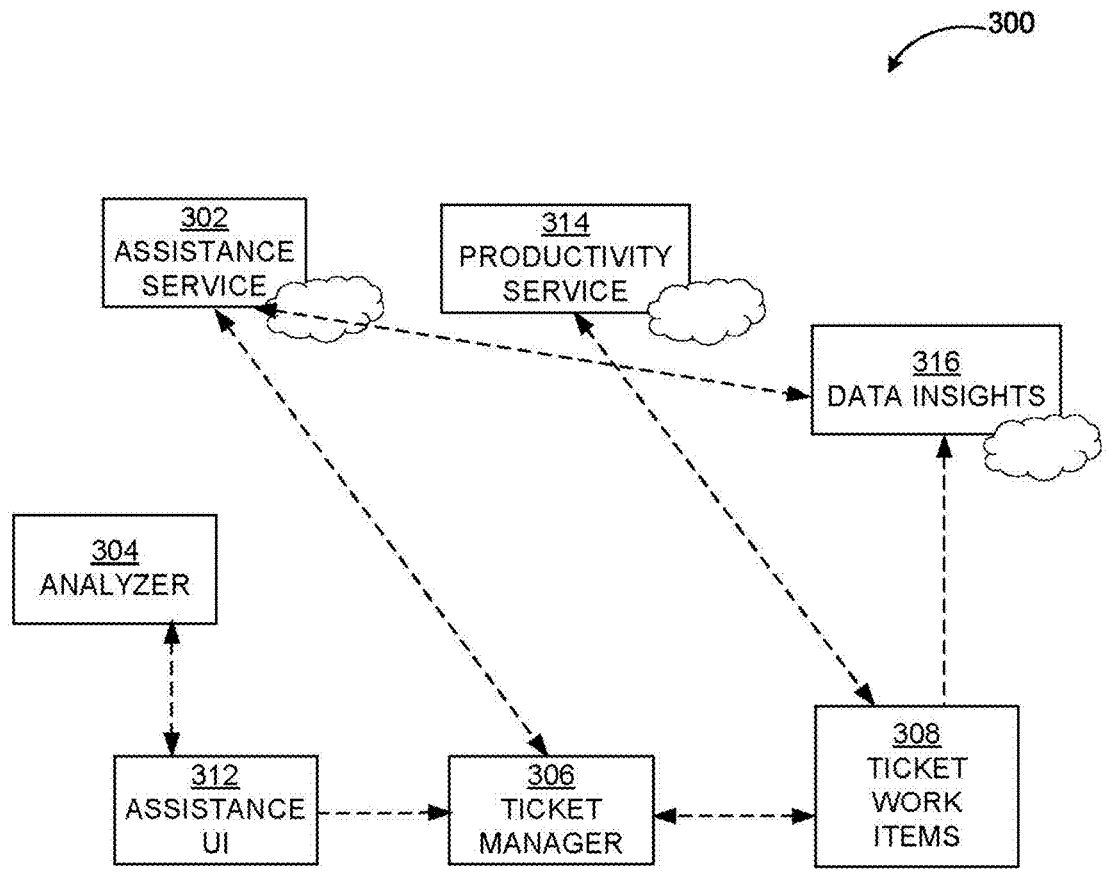
FIG. 3 illustrates example interactions between major components of a system for personalized diagnostics, troubleshooting, recovery, and notification based on application state.

FIG. 3 illustrates example interactions between major components of a system for personalized diagnostics, troubleshooting, recovery, and notification based on application state.

In diagram 300, example major components in providing personalized diagnostics, troubleshooting, recovery, and notification based on application state are shown. An assistance application or service according to embodiments may be implemented with additional or fewer components performing additional or fewer tasks than those described herein.

In the example configuration of diagram 300, an assistance service 302 may manage diagnostic, recovery, and related actions for subscribers of a productivity service 314. A flow of actions may begin with a user input through the assistance user interface (UI) 312 reporting a problem or by automatic detection of the problem by the assistance service 302. The assistance UI 312 may also receive notification about the productivity service issue from an analyzer module 304. The assistance UI 304 may obtain consent from the user to execute ticket manager 306 in the background and give control to the ticket manager 306. The ticket manager 306 may receive updated configuration information and service health information for the particular user from the assistance service 302 and provide telemetry data to the assistance service 302.

The ticket manager 306 may register notifications for the assistance UI 312 and any other module or engine that is listening (e.g., telemetry collection engines) to update progress on current service issue(s). The ticket manager 306 may also persist and update configuration, information. Ticket work item(s) 308 may be instantiated by the ticket manager 306 and may be used to troubleshoot the productivity service 314. Results may be reported to the ticket manager 306 by the ticket work item(s) 308 along with data to data insights service 316 for subsequent analysis of common issues. The reports may be repeated based on recurrence interval for the duration of the issue in some examples. The ticket work item(s) 308 may also compute a pass rate upon resolution of the issue and notify the ticket manager 306. For example, a determination may be made how successful the initially identified solution was, how many iterations it took to resolve the issue, and so on.

Figure 4:
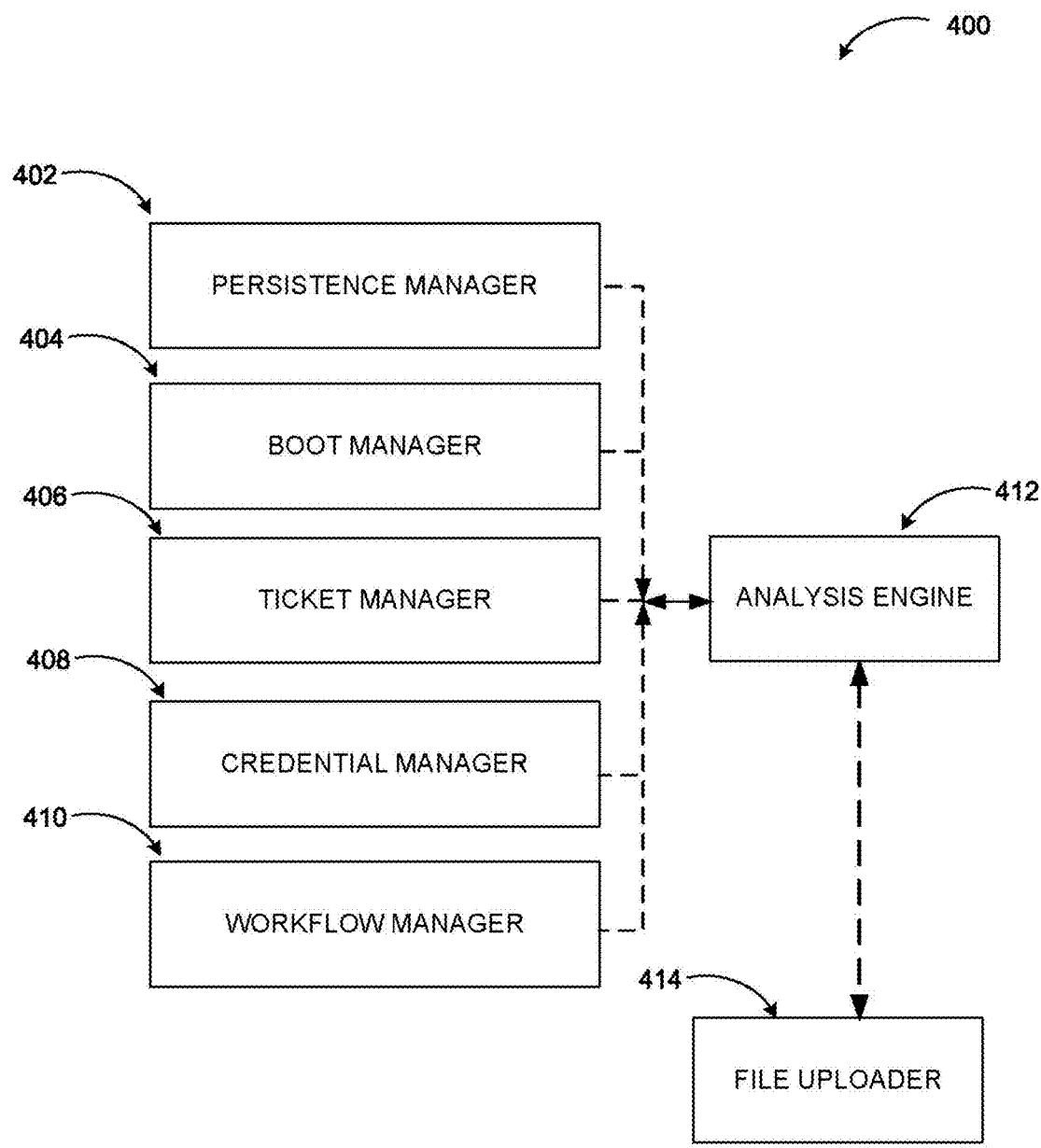
FIG. 4 illustrates example components in providing personalized diagnostics, troubleshooting, recovery, and notification based on application state.

FIG. 4 illustrates example components in providing personalized diagnostics, troubleshooting, recovery, and notification based on application state.

As mentioned previously, a number of local and remote resources may be used/queried during the diagnostic and resolution of an issue by an assistance service or application. Diagram 400 shows some example resources that may be utilized by an assistance application/service in personalized diagnostics, troubleshooting, recovery, and notification based on application state. A persistence manager 402, a boot manager 404, and a credential manager 408 may provide information associated with persistence of the application, a boot record associated with the application, user credentials and their usage, respectively, in some examples. A ticket manager 406 may manage issue tickets created through the assistance service. A workflow manager may manage local and/or remote analyzer workflows. The analysis engine 412 may analyze reported issues based on input from these and other resources and provide information related to the issue as well as its resolution to a file uploader to uploading to the assistance service.

In addition to the above listed resources, others such as a logger module to record items in local storage may also be used. Other example resources may include a remote trace listener for providing telemetry to the assistance service, various UI plug-ins to manage scenario and wizard views, and comparable ones.

The examples provided in FIGS. 1 through 4 are illustrated with specific systems, services, applications, modules, codes, and notifications. Embodiments are not limited to environments according to these examples. Personalized diagnostics, troubleshooting, recovery, and notification based on application state may be implemented in environments employing fewer or additional systems, services, applications, engines, codes, and user experience configurations. Furthermore, the example systems, services, applications, modules, and notifications shown in FIGS. 1 through 4 may be implemented in a similar manner with other values using the principles described herein.

Figure 5:
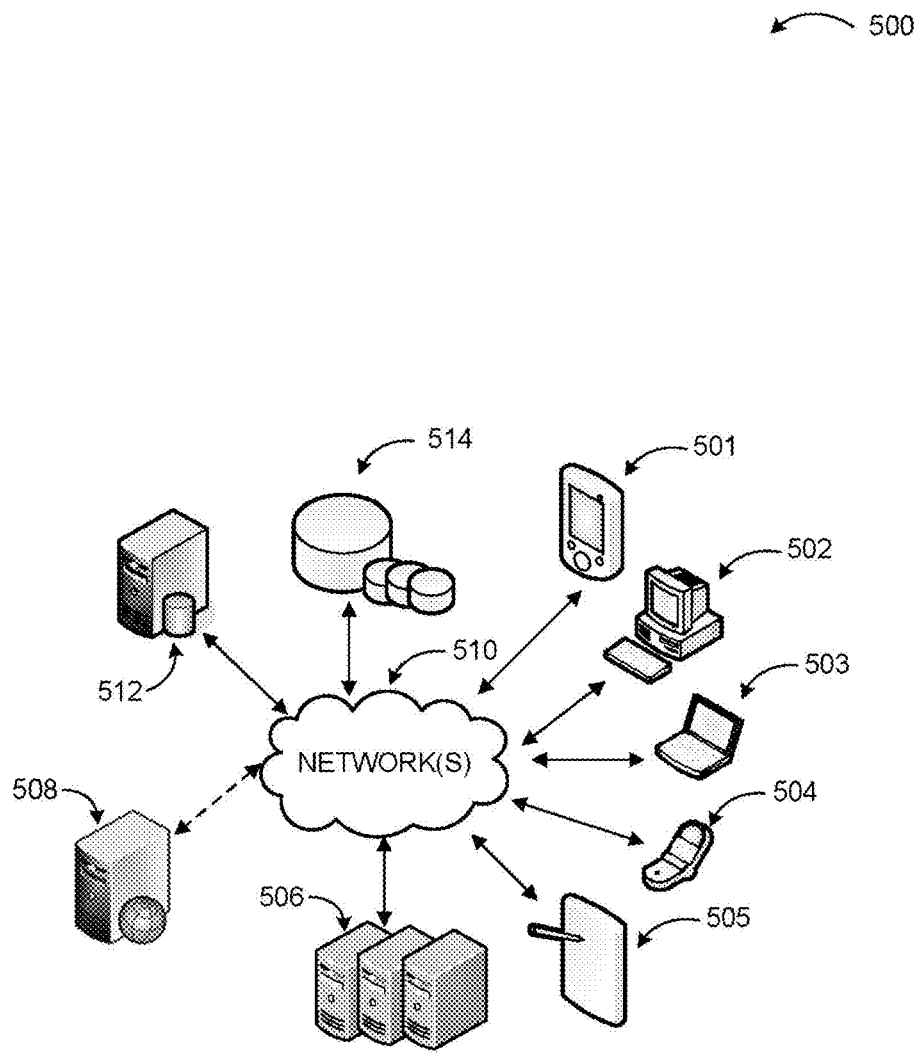
FIG. 5 is a networked environment, where a system according to embodiments may be implemented.

FIG. 5 is a networked environment, where a system according to embodiments may be implemented. In addition to locally installed applications (for example, application 106), personalized diagnostics, troubleshooting, recovery, and notification based on application state may also be employed in conjunction with hosted applications and services (for example, a productivity service 114) that may be implemented via software executed over one or more servers 506, individual server 508, or at client devices, as illustrated in diagram 500. A hosted service or application may communicate with client applications on individual computing devices such as a handheld computer 501, a desktop computer 502, a laptop computer 503, a smart phone 504, a tablet computer (or slate), 505 ('client devices') through network(s) 510 and control a user interface presented to users.

Client devices 501-505 are used to access the functionality provided by the hosted service or application. One or more of the servers 506 or server 508 may be used to provide a variety of services as discussed above. Relevant data such as cloud stored versions of the files may be stored in one or more data stores (e.g. data store 514), which may be managed by any one of the servers 506 or by database server 512.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, engines, data sources, and data distribution systems may be employed for personalized diagnostics, troubleshooting, recovery, and notification based on application state. Furthermore, the networked environments discussed in FIG. 5 are for illustration purposes only. Embodiments are not limited to the example applications, engines, or processes.

Figure 6:
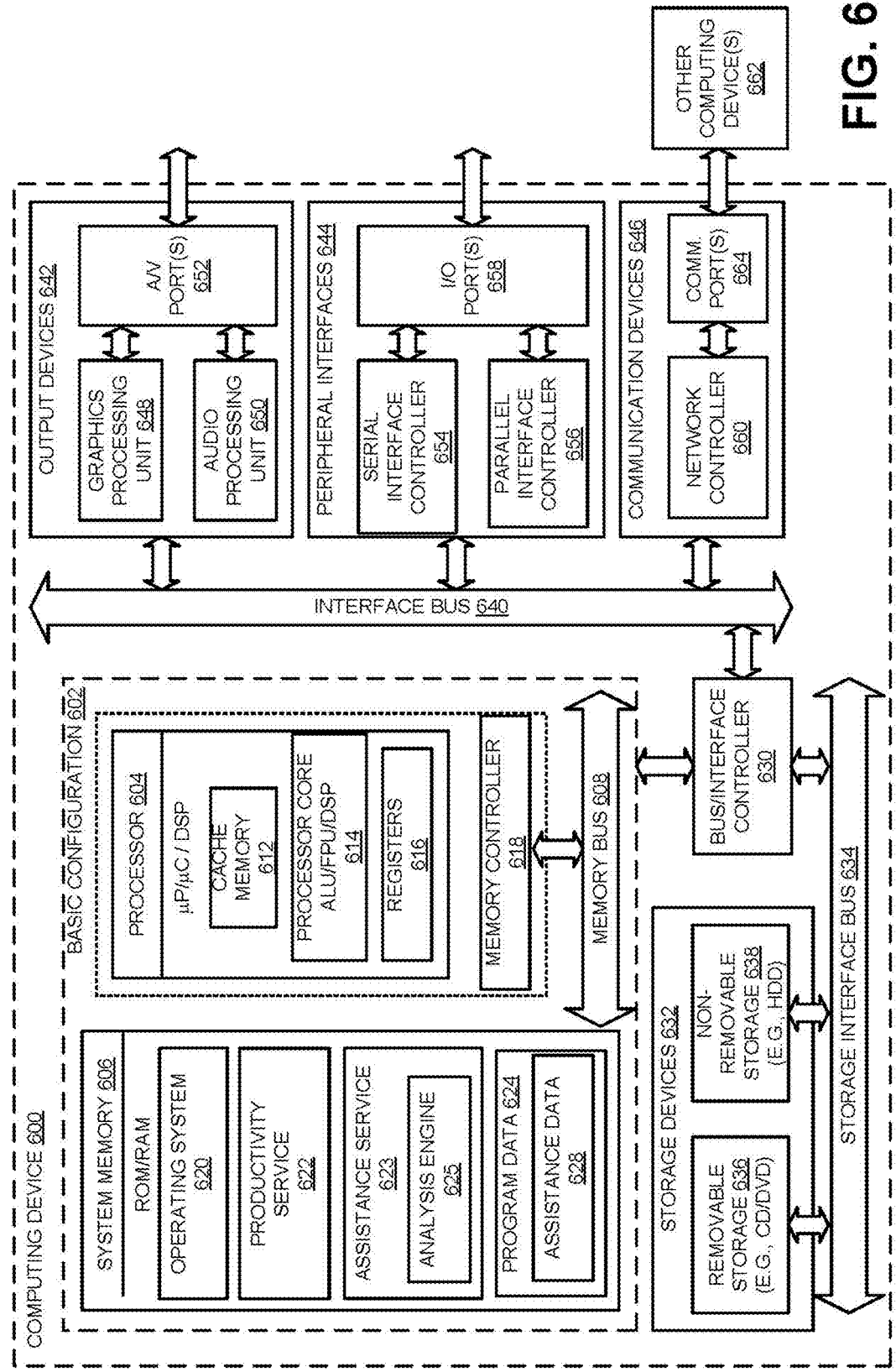
FIG. 6 is a block diagram of an example general purpose computing device, which may be used to provide personalized diagnostics, troubleshooting, recovery, and notification based on application state.

FIG. 6 is a block diagram of an example general purpose computing device, which may be used to provide personalized diagnostics, troubleshooting, recovery, and notification based on application state.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a productivity service 622, an assistance service 623, and program data 624. The assistance service 623 may provide personalized diagnostics, troubleshooting, recovery, and notification based on application state in conjunction with the analysis engine 625 for the productivity service 622. The program data 624 may include, among other data, assistance data 628 such as telemetry data, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to provide personalized diagnostics, troubleshooting, recovery, and notification based on application state. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
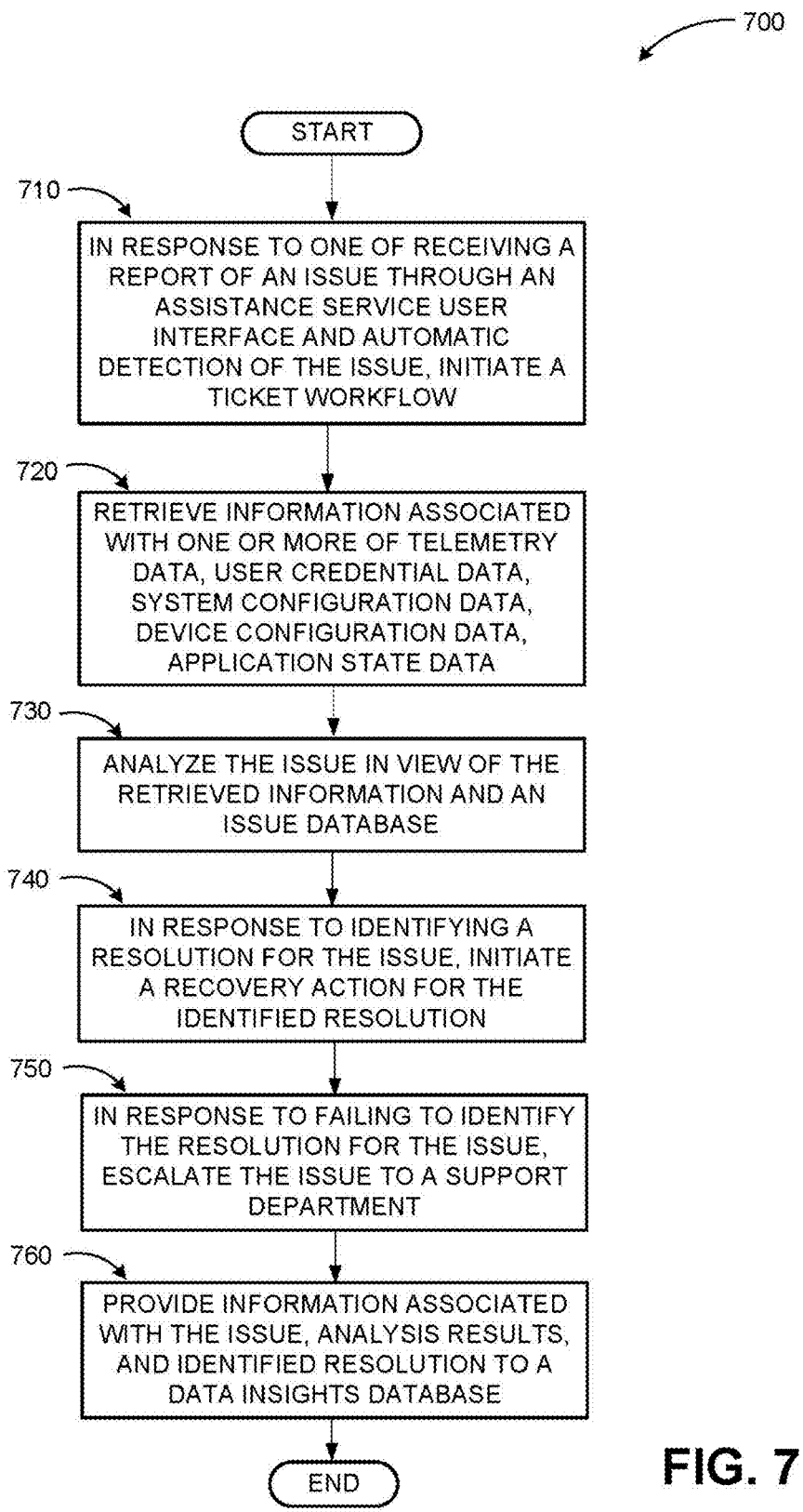
FIG. 7 illustrates a logic flow diagram of a method to provide personalized diagnostics, troubleshooting, recovery, and notification based on application state.

FIG. 7 illustrates a logic flow diagram of a method to provide personalized diagnostics, troubleshooting, recovery, and notification based on application state, according to embodiments.

Process 700 may be implemented on a computing device, server, or other system. An example system may include a computer communicatively coupled to a productivity service server.

Process 700 begins with operation 710, where a ticket workflow may be initiated in response to one of receiving a report of an issue through an assistance service user interface and automatic detection of the issue. At operation 720, information associated with one or more of telemetry data, user credential data, system configuration data, device configuration data, application state data may be retrieved from one or more local and remote resources. In some examples, the assistance service or application may continuously monitor the resources and collect at least some of the information prior to reporting or detection of the issue.

At operation 730, the issue may be analyzed in view of the retrieved information and an issue database by an analysis engine. Error patterns may be identified and corresponding resolutions may be checked. At operation 740, a recovery action for the identified resolution may be identified in response to identifying a resolution for the issue. If the resolution is not identified, the issue may be escalated to a support department at operation 750. At operation 760, information associated with the issue, analysis results, and identified resolution may be provided to a data insights database for analysis and updating of the data insights database for future issue detections and resolutions.

The operations included in process 700 are for illustration purposes. Personalized diagnostics, troubleshooting, recovery, and notification based on application state may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to embodiments, a means for providing personalized diagnostics, troubleshooting, recovery, and notification based on an application state is described. The means may include a means for initiating a ticket workflow in response to one of receiving a report of an issue through a user interface of an assistance service and automatic detection of the issue by the assistance service; a means for retrieving information associated with one or more of telemetry data, user credential data, system configuration data, device configuration data, and application state data; a means for analyzing the issue in view of the retrieved information and an issue database; a means for initiating a recovery action for the identified resolution in response to identifying a resolution for the issue; a means for escalating the issue to a support department in response to failing to identify the resolution for the issue; and a means for providing information associated with the issue, analysis results, and the identified resolution to a data insights database.

According to some embodiments, a method to provide personalized diagnostics, troubleshooting, recovery, and notification based on an application state is described. The method may include in response to one of receiving a report of an issue through a user interface of an assistance service and automatic detection of the issue by the assistance service, initiating a ticket workflow; retrieving information associated with one or more of telemetry data, user credential data, system configuration data, device configuration data, and application state data; analyzing the issue in view of the retrieved information and an issue database; in response to identifying a resolution for the issue, initiating a recovery action for the identified resolution; in response to failing to identify the resolution for the issue, escalating the issue to a support department; and providing information associated with the issue, analysis results, and the identified resolution to a data insights database.

According to other examples, the ticket workflow may be managed by a ticket manager component of the assistance service, and the ticket manager component may be configured to persist and update a service configuration. The method may also include receiving updated configuration information and health information from the service for a user reporting the issue, and providing the telemetry data to an analysis engine of the assistance service from the ticket manager, where the telemetry data includes one or more of local resource usage, remote resource usage, and network connectivity. The application state data may include state data of one or more components of the service and state data of one or more other applications executed on a computing device of a user.

According to further examples, the method may further include receiving the state data of the one or more other applications executed on the computing device of the user through predefined application programming interfaces (APIs) of the one or more other applications, and receiving one or more of identified issues, corresponding resolutions, and error patterns from the issue database. Initiating the recovery action for the identified resolution may include prompting a user to take one or more actions. Escalating the issue to the support department may include providing background information associated with the analysis to the support department; and enabling the support department to contact a user by prompting the user to provide a contact preference.

According to further examples, a computing device to provide personalized diagnostics, troubleshooting, recovery, and notification based on an application state is described. The computing device may include a communication interface configured to facilitate communication between the computing device and one or more servers; a memory configured to store instructions; and one or more processors coupled to the memory, where the one or more processors, in conjunction with the instructions stored in the memory, are configured to execute a productivity service. The productivity service may include one or more productivity applications and an assistance application, where the assistance application may be configured to in response to one of receiving a report of an issue through a user interface of the assistance application and automatic detection of the issue by the assistance application, initiate a ticket workflow; retrieve information associated with one or more of telemetry data, user credential data, system configuration data, device configuration data, and application state data; analyze the issue in view of the retrieved information and an issue database; in response to identifying a plurality of potential resolutions for the issue, iteratively perform a plurality of corresponding recovery actions for the identified plurality of potential resolutions; in response to failing to identify a resolution for the issue, escalate the issue to a support department; and provide information associated with the issue, analysis results, and the identified resolution to a data insights database.

According to some examples, the assistance application may be further configured to retrieve at least a portion of the information associated with one or more of the telemetry data, the user credential data, the system configuration data, the device configuration data, and the application state data prior to receiving the reporting of the issue or the automatic detection of the issue. The assistance application may include a ticket manager component configured to execute in a background, manage the ticket workflow, and receive updated configuration information and health information from the productivity service. The ticket manager component may be further configured to register one or more notifications for the user interface of the assistance application and one or more listener modules to update progress on current productivity service issues. The assistance application may be executed on one of a plurality of servers configured to execute components of the productivity service and accessed through a client application executed on a client device. The productivity service may include one or more of a word processing application, a spreadsheet application, a presentation application, a note taking application, a communication application, and a calendar application.

According to further examples, an assistance service to provide personalized diagnostics, troubleshooting, recovery, and notification based on an application state is described. The assistance service may include a user interface manager configured to receive a report of an issue associated with an application through the user interface; a ticket manager configured to initiate and manage a ticket workflow in response to the reported issue; instantiate ticket work items to diagnose the application; and update system configuration data; and an analysis engine configured to receive information associated with one or more of telemetry data, user credential data, system configuration data, device configuration data, and application state data; and analyze the issue in view of the received information and an issue database; and the ticket work items configured to in response to identifying a plurality of potential resolutions for the issue, iteratively perform a plurality of corresponding recovery actions for the identified plurality of potential resolutions; in response to failing to identify a resolution for the issue, escalate the issue to a support department; and provide information associated with the issue, analysis results, and the identified resolution to a data insights database.

According to other examples, the assistance service may also include a workflow manager configured to manage local and remote analysis workflows; and a file uploader configured to upload the information associated with the issue, the analysis results, and the identified resolution to the assistance service. The ticket manager may be further configured to receive reports on results of the recovery actions. The reports may be repeated based on a recurrence interval for the duration of the issue. The assistance service may be an independent service or part of a productivity service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide personalized diagnostics, troubleshooting, recovery, and notification based on an application state via a productivity service providing an assistance service, the method comprising:
   determining an encountered error associated with an application;
   retrieving information associated with one or more of telemetry data, user credential data, system configuration data, device configuration data, and application state data;
   analyzing the encountered error in view of the retrieved information and an encountered error database in order to identify a resolution for the encountered error; and
   in response to identifying a resolution for the encountered error, initiating a recovery action for the identified resolution and updating the encountered error database based on an analysis of the encountered error, the identified resolution, the retrieved information, a determined level of success for the identified resolution, and a number of iterations required to resolve the encountered error, and
   providing information associated with the encountered error, analysis results, and the identified resolution to a data insights database.

2. The method of claim 1, further comprising initiating a ticket workflow, wherein the ticket workflow is managed by a ticket manager component of the assistance service, and the ticket manager component is configured to persist and update a service configuration.

3. The method of claim 2, further comprising:
   receiving updated configuration information and health information from the productivity service for a user associated with the encountered error.

4. The method of claim 2, further comprising:
   providing the telemetry data to an analysis engine of the assistance service from the ticket manager, wherein the telemetry data includes one or more of local resource usage, remote resource usage, and network connectivity.

5. The method of claim 2, wherein the application state data includes state data of one or more components of the productivity service and state data of one or more other applications executed on a computing device of a user.

6. The method of claim 5, further comprising:
   receiving the state data of the one or more other applications executed on the computing device of the user through predefined application programming interfaces (APIs) of the one or more other applications.

7. The method of claim 1, further comprising:
receiving one or more of identified encountered errors, corresponding resolutions, and error patterns from the encountered error database.

8. The method of claim 1, wherein initiating the recovery action for the identified resolution comprises: prompting a user to take one or more actions.

9. The method of claim 1, further comprising, in response to failing to identify the resolution for the encountered error, escalating the encountered error to a support department, wherein escalating the encountered error to the support department comprises:
providing background information associated with the analysis to the support department; and
enabling the support department to contact a user by prompting the user to provide a contact preference.

10. A computing device to provide personalized diagnostics, troubleshooting, recovery, and notification based on an application state, the computing device comprising:
a communication interface configured to facilitate communication between the computing device and one or more servers;
a memory configured to store instructions; and
one or more processors coupled to the memory, wherein the one or more processors, in conjunction with the instructions stored in the memory, are configured to execute a productivity service, the productivity service comprising:
one or more productivity applications and an assistance application, wherein the assistance application is configured to:
determine an encountered error associated with one of the one or more productivity applications;
retrieve information associated with one or more of telemetry data, user credential data, system configuration data, device configuration data, and application state data;
analyze the encountered error in view of the retrieved information and an encountered error database in order to identify a plurality of potential resolutions for the encountered error;
in response to identifying the plurality of potential resolutions for the encountered error, iteratively perform a plurality of corresponding recovery actions for the identified plurality of potential resolutions, update the encountered error database based on an analysis of the encountered error, the identified plurality of potential resolutions, the retrieved information, a determined level of success for the identified plurality of potential resolutions, and a number of iterations required to resolve the encountered error; and
provide information associated with the encountered error, analysis results, and the identified plurality of resolutions to a data insights database.

11. The computing device of claim 10, wherein the assistance application is further configured to:
retrieve at least a portion of the information associated with one or more of the telemetry data, the user credential data, the system configuration data, the device configuration data, and the application state data prior to determining the encountered error.

12. The computing device of claim 10, wherein the assistance application includes a ticket manager component configured to execute in a background, manage a ticket workflow initiated for the encountered error, and receive updated configuration information and health information from the productivity service.

13. The computing device of claim 12, wherein the ticket manager component is, further configured to:
register one or more notifications for a user interface of the assistance application and one or more listener modules to update progress on current productivity service issues.

14. The computing device of claim 10, wherein the assistance application is executed on one of a plurality of servers configured to execute components of the productivity service and accessed through a client application executed on a client device.

15. The computing device of claim 10, wherein the productivity service includes one or more of a word processing application, a spreadsheet application, a presentation application, a note taking application, a communication application, and a calendar application.

16. A system for providing personalized diagnostics, troubleshooting, recovery, and notification based on an application state, the system comprising:
a first server executing a productivity service; and
a second server communicatively coupled to the first server and executing an assistance service, the assistance service configured to:
determine an encountered error associated with an application associated with the productivity service;
receive information associated with one or more of telemetry data, user credential data, system configuration data, device configuration data, and application state data; and
analyze the encountered error in view of the received information and an encountered error database in order to identify a plurality of potential resolutions for the encountered error;
in response to identifying the plurality of potential resolutions for the encountered error, iteratively perform a plurality of corresponding recovery actions for the identified plurality of potential resolutions, updating the encountered error database based on an analysis of the encountered error, the identified plurality of potential resolutions, the retrieved information, a determined level of success for the identified plurality of potential resolutions, and a number of iterations required to resolve the encountered error, and
provide information associated with the encountered error, analysis results, and the identified resolution to a data insights database.

17. The system of claim 16, the assistance service comprising:
a workflow manager configured to manage local and remote analysis workflows; and
a file uploader configured to upload the information associated with the encountered error, the analysis results, and the identified resolution to the assistance service.

18. The system of claim 16, wherein the assistance service is further configured to receive reports on results of the recovery actions.

19. The system of claim 18, wherein the reports are repeated based on a recurrence interval for the duration of the issue.

20. The system of claim 16, wherein the assistance service is one of an independent service and part of the productivity service.

* * * * *